Dec. 11, 1923.
F. W. MEYER ET AL
APPARATUS FOR MEASURING THE FLOW OF FLUIDS
Filed April 16, 1917
1,476,762
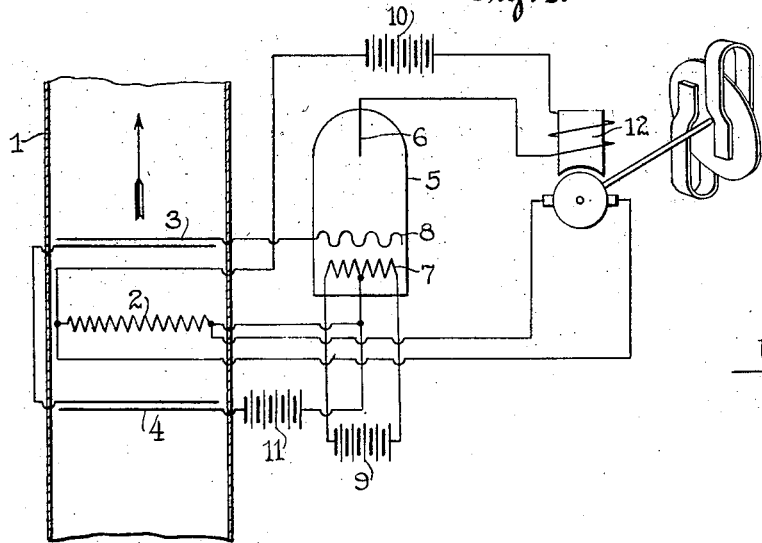
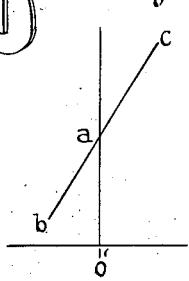
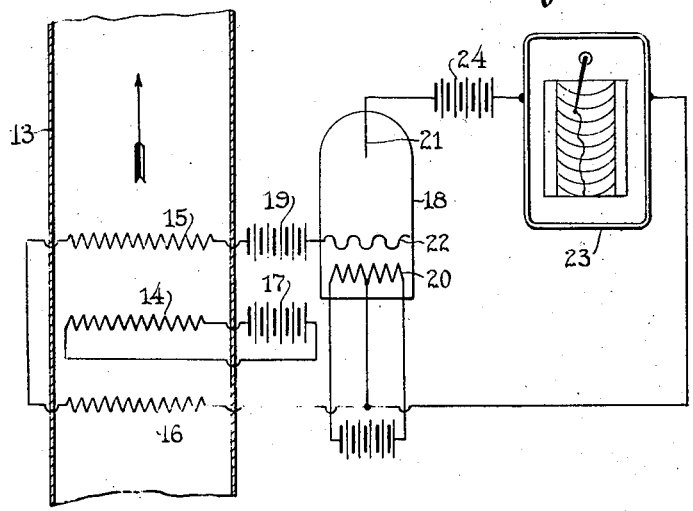
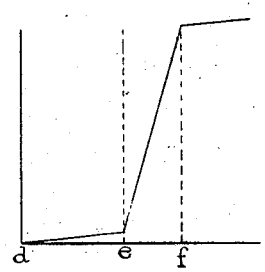
Inventors
Friedrich W. Meyer
Arthur Simon
By Frank V. Hubbard
Attorney Patented Dec. 11, 1923.

1,476,762

UNITED STATES PATENT OFFICE.

FRIEDRICH W. MEYER, OF MADISON, AND ARTHUR SIMON, OF MILWAUKEE, WISCONSIN, ASSIGNORS TO THE CUTLER-HAMMER MFG. CO., OF MILWAUKEE, WISCONSIN, A CORPORATION OF WISCONSIN.

APPARATUS FOR MEASURING THE FLOW OF FLUIDS.

Application filed April 16, 1917. Serial No. 162,445.

*To all whom it may concern:*

Be it known that we, FRIEDRICH WILHELM MEYER, a citizen of the German Empire, residing at Madison, in the county of Dane and State of Wisconsin, and ARTHUR SIMON, a citizen of the United States, residing at Milwaukee, in the county of Milwaukee and State of Wisconsin, have invented new and useful Improvements in Apparatus for Measuring the Flow of Fluids, of which the following is a full, clear, concise, and exact description, reference being had to the accompanying drawing, forming a part of this specification.

This invention relates to apparatus for measuring the flow of fluids and more particularly to apparatus wherein measurement is accomplished through the medium of electrical means.

Apparatus embodying the invention may assume various forms for measuring the flow of fluids according to different methods including, among others, the following two methods: One of these methods consists in passing the fluid to be measured through a device containing a heating element and thermal devices, the latter being arranged to be respectively subjected to the influence of the fluid before and after heating thereof by said element and then measuring the heat output of said element required to maintain a constant temperature difference between said thermal devices. The other method consists in passing the fluid through a similar device and then measuring the temperature difference of the thermal devices with a constant heat output of said element.

An object of the present invention is to provide apparatus of the character stated, which will be of increased sensitiveness and which will tend to curtail the amount of electrical energy required.

Another object is to provide apparatus of the character stated which will respond more quickly to varying conditions and hence measure more accurately variations in the flow of fluid.

Another object is to provide simplified apparatus of the character stated which may be readily constructed for various capacities and in relatively small sizes at a cost more nearly in proportion to the capacity thereof.

Various other objects will hereinafter appear.

According to the invention, it is proposed to employ an electroionic device for controlling the electrical means through the medium of which measurement is accomplished and to obtain the desired control of the latter by subjecting said electroionic device to the influence of variations in flow of the fluid to be measured.

The forms of the invention shown in the drawing will now be described.

In the drawing,

Figure 1 shows schematically and diagrammatically apparatus for measuring in accordance with the first mentioned method;

Fig. 2 depicts certain characteristics of the electroionic device of Fig. 1;

Fig. 3 shows schematically and diagrammatically apparatus for measuring in accordance with the second mentioned method; and, Fig. 4 depicts certain characteristics of the electroionic device of Fig. 3.

Referring to Fig. 1, the apparatus shown therein includes a pipe or conduit 1 for the fluid, having arranged therein an electrical heating element 2 and a thermo-couple 3—4, said element being arranged between the junctions of said thermo-couple. It is assumed that the fluid flows through the pipe in the direction of the arrow and that the junction 3 of the thermo-couple is hot while the junction 4 is cold. Further, the apparatus includes an electroionic device 5 which may be assumed to be a pure electron relay having the characteristics depicted in Fig. 2, as hereinafter set forth. This device has an anode 6, a cathode 7 and an auxiliary anode 8 preferably in the form of a grid. The cathode is normally heated by a battery 9 and said cathode and anode 6 are included in the circuit of the heating element 2, which circuit is supplied with energy from a battery 10. On the other hand, the cathode 7 and the auxiliary anode 8 are included in the circuit of the thermo-couple, which circuit is supplied with energy from a battery 11 subject to restriction by said thermo-couple as hereinafter set forth. Lastly, the apparatus includes an electrical meter 12 for measuring the energy supplied to the heating element 2, said meter being shown as of the watthour type, with a field winding in series with said element between the battery 10 and anode 6 of the electroionic device and an armature connected in shunt with said element. In this connection, it is of course to be understood that any other preferred form of meter or recording device might be substituted for the meter shown.

Assuming the cathode of the electroionic device to be heated, said device causes a flow of current from the battery 10 through the heating element 2 and further assuming an impressed potential between the auxiliary anode 8 and cathode, said device also causes a flow of current from the battery 11 through the thermo-couple circuit. The thermo-couple bucks the battery 11 to a degree varying with the temperature difference between its junctions 3 and 4, such temperature difference being in turn influenced by the rate of flow cf fluid. More specifically, with a given rate of flow of fluid and a given heat output of the heating element, the thermo-couple has a definite and constant bucking effect, for example, such as to reduce the potential of its circuit to zero. If the flow of fluid is increased, the temperature difference between the junctions of the thermo-couple is reduced with a consequent reduction in its bucking effect. This in turn causes an increase in the potential of the thermo-couple circuit, or in other words, an increase in the supplemental potential of the electroionic device with a consequent increase in the supply of energy to the heating element through said device. Conversely if the flow of fluid is decreased, the heat output of said element remaining constant, the temperature difference between the junctions of said thermo-couple is increased with a consequent decrease in the potential of the circuit of the latter. This in turn reduces the supplemental potential of the electroionic device, causing said device to reduce the supply of energy to the heating element. Also, said device in varying the supply of energy to the heating element regulates the action of the meter 12 accordingly, whereby said meter functions to measure the energy input of said heating element.

Moreover, as will be understood, an electroionic device, such as that specified, effects relatively large variations in its main circuit, including the heating element and meter field winding, upon relatively small variations in its sensitive circuit, including the thermo-couple. Also, such a device may have the characteristics depicted in Fig. 2 if it has a pure electronic discharge without ionization. Referring thereto, the ordinates represent the current of the main circuit of the electroionic device, while the abscissæ represent the supplemental potential of the sensitive circuit, the point $o$ representing zero supplemental potential. More specifically, with zero supplemental potential, the current of the main circuit has a value represented by $a$ and upon variation of the supplemental potential, such current, within certain limits, increases or decreases along a subtantially straight line curve $b$—$c$ according to the character of variation of the supplemental potential. Thus, the device provides for ready adjustment of the heating element to maintain a substantially constant temperature difference between the junctions of the thermo-couple as the flow of fluid varies and also corresponding adjustment of the meter 12. Furthermore, all desired corrections are rendered easily attainable since the currents in the sensitive circuit are, in any event, small and are eliminated under negative potential conditions of said circuit.

In connection with this type of apparatus, it is to be noted that the accuracy thereof is independent of variations in the temperature of the fluid supplied thereto since measurement of the flow of fluid is based upon the energy input or heat output of the heating element, which is varied in accordance with the difference in temperature between the junctions of the thermo-couple.

Referring now to Fig. 3, the apparatus shown therein includes a pipe or conduit 13, similar to that above described, an electrical heating element 14 arranged therein and resistance thermometers 15 and 16 arranged within said conduit on opposite sides of the heating element. In this instance the heating element receives a substantially constant energy input from a battery 17 while the resistance thermometers are connected in series through an electroionic device 18 and supplied with current from a battery 19. The electroionic device 18 as regards its anode and cathode arrangement is similar to the device above described, the same being provided with a heated cathode 20, an anode 21 and an auxiliary anode 22, and as in the apparatus described, the cathode and auxiliary anode are included in series with the thermal devices, i. e., the resistance thermometers. However, the electroionic device is assumed to be of the luminous type having a very low pressure so as to have a certain space charge of electrons not totally compensated by positive ions of the luminous discharge. And in this instance said device is utilized to regulate only the circuit of a suitable instrument 23, as for example, a recording ammeter, said circuit being supplied with energy from a battery 24.

In this form of apparatus the electroionic device, upon heating of its cathode, causes flow of current in both the instrument circuit and the circuit of resistance thermometers 15 and 16 and varies the current of the former circuit upon variations in its supplemental potential, i. e., the potential of the latter circuit. The supplemental potential in turn is controlled by the temperature of the resistance thermometers 15 and 16 and assuming a constant temperature of the fluid supplied to the apparatus, the temperature of the resistance thermometer 16 remains constant while the temperature of the resistance thermometer 15 varies with the rate of flow of the fluid. Thus the electroionic device is rendered sensitive to such temperature variations and in turn varies the current of the instrument circuit according to such temperature variations.

Referring now to Fig. 4, the ordinates represent the current of the main circuit of the electroionic device of Fig. 3, i. e., including the instrument 23, while the abscissæ represent the supplemental potential of said device, i. e., between the cathode and auxiliary anode. As illustrated by the curve, the main current remains practically small through a range of the supplemental potential between points $d$ and $e$, whereas it rises very abruptly through the range in supplemental potential between points $e$ and $f$. Thus if, by reason of a cooling draft, the potential of the circuit of the resistance thermometers 15 and 16 exceeds the value represented by $e$, the electroionic device increases the current supplied to the recording instrument 23, thereby enabling said instrument to record the variations in temperature of resistance thermometer 15, or in other words, the rate of flow of the fluid.

In connection with both forms of apparatus illustrated it is, of course, to be understood that additional electroionic devices might be employed in conjunction with those illustrated, to amplify the regulative tendencies of the latter and that if incorporation of correcting means in either apparatus is desired, such means may assume known forms or may utilize electroionic devices similar to those herein disclosed. And as will be readily appreciated, the correction devices may be made very simple and small in view of the small currents in the sensitive circuits. Also, it is to be understood that other forms of electroionic relays may be employed in lieu of the electroionic devices illustrated.

What we claim as new and desire to secure by Letters Patent is:

1. In apparatus for measuring the flow of fluids, the combination with a device providing a conduit for the fluid to be measured, of electrical measuring means to be influenced by variations in the flow of fluid through said device and means including an electroionic device for causing the measuring means to be so influenced.

2. In apparatus for measuring the flow of fluids, the combination with a device providing a conduit for the fluid to be measured, of electrical measuring means to be influenced by variations in the flow of fluid through said device, means to create electrical influences upon variations in the flow of fluid and an electroionic device for transmitting such influence to said measuring means.

3. In apparatus for measuring the flow of fluids, the combination with a device providing a conduit for the fluid to be measured, of an electroionic device having a sensitive circuit and a main circuit, means subjecting said sensitive circuit to electrical variations upon variations in the flow of fluid and electrical means subjected to the amplified electrical variations in said main circuit of said electroionic device resulting from the variations in said sensitive circuit thereof.

4. In apparatus for measuring the flow of fluids, the combination with means to raise the temperature of the fluid to be measured, of an electroionic device having a sensitive circuit and a main circuit, thermal means influenced by the fluid to vary said sensitive circuit of said device electrically upon variations in the flow of fluid and means subjected to the electrical variations in the main circuit of said device resulting from the electrical variations in the sensitive circuit thereof whereby the rate of flow of fluid may be determined.

5. In apparatus for measuring the flow of fluids, the combination with thermal devices in the path of the fluid to be measured, of means for raising the temperature of the fluid during flow thereof between said devices, an electroionic device having a sensitive circuit and a main circuit, said sensitive circuit including said thermal devices and being subjected to electrical variations thereby upon variations in the flow of fluid and in turn effecting relatively greater electrical variations in the main circuit of said device, and means responsive to electrical variations in said main circuit whereby the rate of flow of fluid may be determined.

6. In apparatus for measuring the flow of fluids, the combination with electrical heating means for the fluid to be measured, of an electroionic device in circuit with said heating means to regulate the energy supplied thereto, said device having a sensitive circuit including means subjecting the same to electrical variations upon variations in the rate of flow of the fluid to be measured.

7. In apparatus for measuring the flow of fluids, the combination with electrical heating means for the fluid to be measured, of an electroionic device in circuit with said heating means to regulate the energy supplied thereto, said device having a sensitive circuit including thermal means subjecting the same to electrical variations upon variations in the rate of flow of fluid to be measured.

8. In apparatus for measuring the flow of fluids, the combination with thermal devices in the path of the fluid to be measured, of an electrical heating device to raise the temperature of the fluid during flow thereof between said devices, and an electroionic device included in circuit with said heating device and having a sensitive circuit including said thermal devices, said thermal devices acting to vary the potential of said sensitive circuit upon variations in the flow of fluid and said electroionic device acting to vary the supply of energy to said heating means upon variations in the potential of its sensitive circuit.

9. In apparatus for measuring the flow of fluids, the combination with thermal devices in the path of the fluid to be measured, of an electrical heating device to raise the temperature of the fluid during flow thereof between said devices, an electroionic device included in circuit with said heating element and having a sensitive circuit including said thermal devices, said thermal devices acting to vary the potential of said sensitive circuit upon variations in the flow of fluid and said electroionic device acting to vary the supply of energy to said heating means upon variations in the potential of its sensitive circuit and means also subject to regulation by said electroionic device whereby the energy input of said heating means may be determined for determination of the rate of flow of fluid.

10. In a thermal fluid meter, in combination, a registering device, an electro-ionic device to control the action of the same and means whereby said electro-ionic device is subjected to influence of thermal changes in the fluid proportional to the rate of flow thereof to thereby cause said registering device to indicate such rate of flow of the fluid.

11. In a thermal fluid meter, in combination, a heater to act upon the fluid, means responsive to the resultant changes in temperature of the fluid, a registering device and an electroionic device having operative connection with said temperature responsive means and said registering device to cause the latter to register the rate of flow of the fluid.

12. In a thermal fluid meter, in combination, a device to effect transfer of heat between an element thereof and the fluid, means for determining the rate of flow of the fluid comprising an electro-ionic device, means whereby said latter device is rendered responsive to the effect of the heat exchange between said element and the fluid and a registering device having means subjecting the same to control by said electro-ionic device for registering the rate of flow of the fluid.

In witness thereof, we have each hereunto subscribed our name.

Dr. FRIEDRICH W. MEYER.
ARTHUR SIMON.

Witnesses:
E. C. Holt, Jr.,
W. S. Cullinan.